Sept. 18, 1923.
E. H. BELDEN
BRAKE MECHANISM
Original Filed July 19, 1917
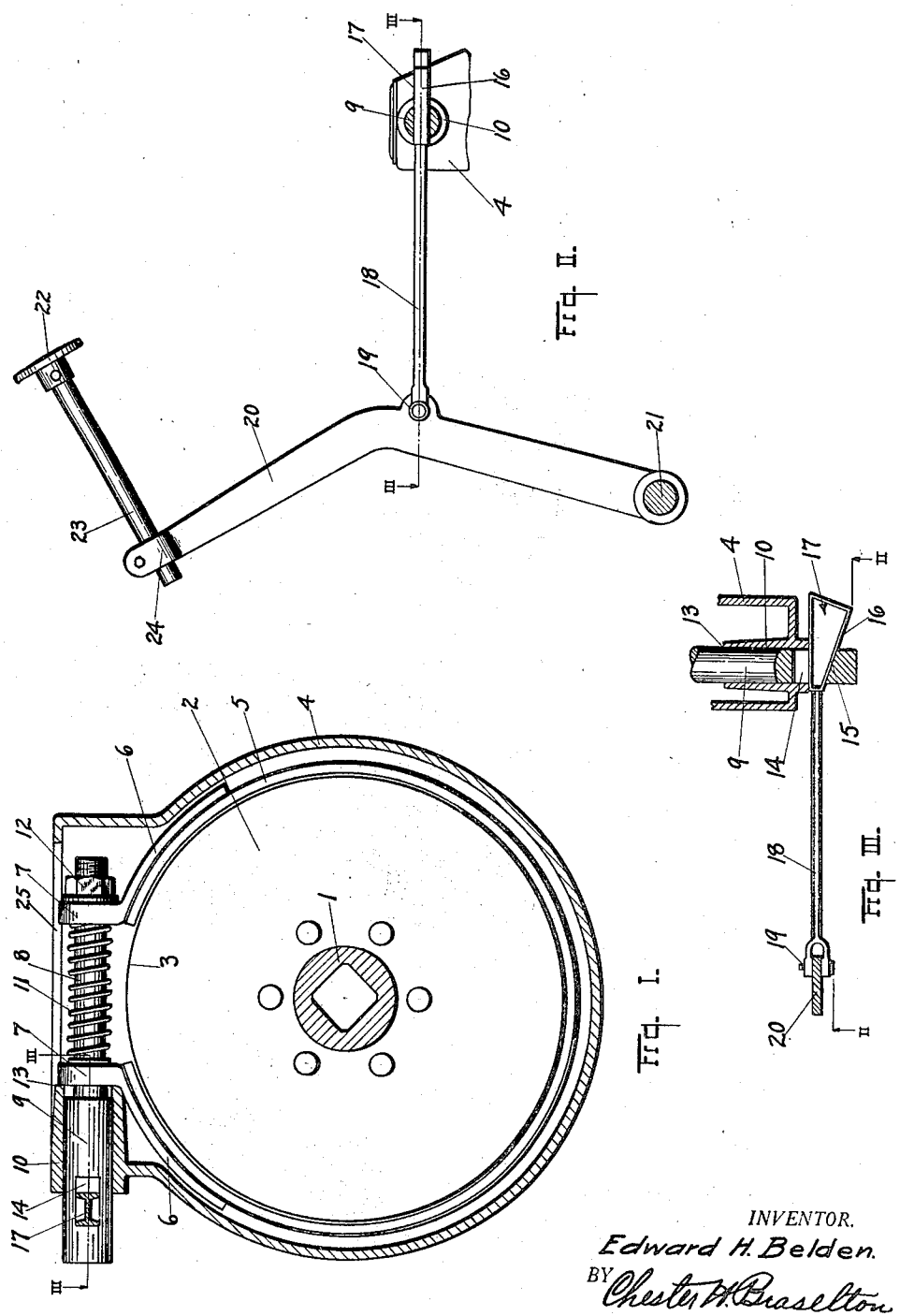
INVENTOR.
Edward H. Belden.
BY Chester W. Braselton
ATTORNEY Patented Sept. 18, 1923.

1,468,453

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

BRAKE MECHANISM.

Original application filed July 19, 1917, Serial No. 181,556. Divided and this application filed March 14, 1919. Serial No. 282,619.

*To all whom it may concern:*

Be it known that I, EDWARD H. BELDEN, a citizen of the United States, residing at Toledo, county of Lucas, and State of Ohio, have invented certain new and useful Improvements in Brake Mechanism, of which I declare the following to be a full, clear, and exact description.

This invention relates to brake mechanism, such as is particularly adapted to be employed in connection with the transmission shaft of a motor vehicle. This application is a division of my co-pending application, Ser. No. 181,556, filed July 19, 1917.

One object of the invention is to provide an improved form of brake mechanism, which is of simple construction and efficient in operation.

A further object of the invention is to provide an improved form of brake mechanism adapted to be readily applied to the transmission shaft of a motor vehicle.

Further objects of this invention relate to economies of manufacture and details of construction, as will hereinafter appear from the detailed description to follow.

The objects of the invention are accomplished in one instance by the devices and means described in the following specification, but it is evident that the same may be varied widely without departing from the scope of the invention as pointed out in the appended claims.

A structure constituting one embodiment of the invention, which may be the preferred, is illustrated in the accompanying drawings forming a part herein, in which:

Fig. I is a sectional view of the transmission brake, illustrating the relative positions of the operating parts with respect to the transmission shaft.

Fig. II is a view in side elevation showing the means for operating the transmission brake.

Fig. III is a horizontal section view, taken along the line III—III of Figs. I and II, and showing in further detail the means for operating the transmission brake.

Similar reference characters refer to corresponding parts throughout the several views, and the sectional views are taken looking in the direction of the small arrows at the ends of the section line.

In the embodiment of the invention illustrated herewith, 1 represents the usual transmission shaft, to which is secured a brake hub 2 provided with an annular peripheral flange 3 extending laterally from the plane of the brake drum. The brake drum 2 together with a laterally extending peripheral flange 3 is enclosed by the transmission brake casing 4, which may form a part of the main transmission casing of the automobile. A brake band 5 is adapted to surround the brake drum and bear against the exterior surface of the peripheral flange 3 formed thereon in such a manner that when tension is exerted upon the opposite ends of the brake band to draw the same together, frictional resistance will be encountered between the brake band and the peripheral flange carried by the brake drum in such a manner as to retard the rotative movement of the shaft. A bracket 6 is secured to each of the opposite ends of the brake band, and each of the said brackets is provided with upwardly extending forked ears 7, between the forked ears of each bracket is disposed the stem 8 of a plunger 9 which is slidably mounted in a boss 10 formed in the transmission brake casing. A coiled spring 11 surrounds the stem 8 and is positioned between the forked ears of the opposite brackets in such a manner as to bear against the interior surface thereof and normally maintain the brackets separated from each other, whereby the band brake is held in such position that the brake drum is freely rotatable within the same. A nut 12 is threaded upon the free end of the stem 8 in such a manner as to be capable of adjustment thereon for the purpose of properly adjusting the brake band with respect to the exterior surface of the peripheral flange.

The boss 10 is formed in such a manner as to provide an abutment 13 against which the outer surfaces of the forked ends 7 of one of the brackets 6 is adapted to rest. A slot 14 is formed in the plunger 9 outside of the block 10, the said slot having an inclined or beveled edge 15, which is adapted to co-operate with the inclined edge 16 of the wedge 17 slidably mounted in said slot 14. Said wedge is formed on the rear end of the rod 18 which is pivotally connected at 19 to the bent lever 20 journaled at its lower end upon a fixed shaft 21. The bent lever carries at its upper end the pedal 22, having a stem 23, which is adjustably secured in the forked end 24 of the lever 20, said stem being adapted to extend through the dashboard so as to carry the pedal 22 above the dash in the usual manner. An opening 25 is provided in the top of the transmission brake casing, through which the nut 12 may be adjusted to vary the tension upon the brake band.

The operation of the brake mechanism described above will be clearly understood from the preceding description. The brake band 5 is drawn into close contact with the peripheral flange 3 carried by the brake drum, when the lever 20 is operated by the depression of the pedal 22, since the depression of the pedal 22 causes the rod 18 to be drawn forwardly, thus forcing the beveled edge 15 of the plunger and causing the plunger to be displaced toward the left, as seen in Fig. I, thereby drawing the brackets 6 closer together and bringing the brake band into closer engagement with the outer surface of the peripheral flange. When the pedal 22 is released, the spring 11 separates the brackets 6 and releases the brake band from engagement with the peripheral surface of the brake drum.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except insofar as I have included such limitation within the terms of the following claims, in which it is my intention to claim all novelty inherent in my invention broadly as well as specifically.

What I claim as new and desire to secure by Letters Patent is:—

1. In a device of the class described, the combination of a shaft, a brake drum secured thereto, a brake band surrounding said drum and having brackets secured to its ends provided with laterally extending ears, a slidably mounted plunger having a stem disposed in said forked ears, a fixed abutment engaged by one of said ears, and a nut threaded on the end of said stem and engaging the other ear, a spring on said stem compressed between said ears, said plunger having a transverse wedge-shaped slot, a wedge slidably mounted in said slot and means for shifting said wedge.

2. In a device of the class described, the combination of a shaft, a brake drum secured thereto, a brake band surrounding said drum and having brackets secured to its ends provided with laterally extending ears, a slidably mounted plunger having a stem connected with one of said ears, and means for moving said plunger laterally comprising a wedge slidably mounted in a slot in the plunger.

3. In a device of the class described, a housing, a drum within said housing, a bearing upon the housing, a plunger extending through said bearing, a brake band substantially surrounding said drum with its ends carried by said plunger, said bearing forming an abutment for one end of said band to limit its movement, the other end of said band being movable relatively thereto, yieldable means interposed between the ends of said band and serving to hold the non-movable end thereof in contact with said abutment, and a wedge operatively connected with said plunger for actuating the same.

4. In a device of the class described the combination of a casing, a brake drum enclosed thereby, a brake band surrounding said drum and having one end engaging said casing, an operating rod slidingly mounted in said casing, adjustable means on said rod for engaging the other end of said brake band, said operating rod and said casing having opposed faces and a wedge shaped member movable transversely to said rod and engaging said opposed faces.

5. In a device of the class described the combination of a casing, a brake drum therein, a brake band encircling said drum, a portion of said casing forming an abutment for one end of said brake band and providing a guideway for a reciprocable member adjustably connected to the other end of said brake band, resilient means for separating the ends of said brake band, said casing and said reciprocable member having opposed faces and a pull rod having a wedge shaped end portion for engaging said opposed faces.

6. In a device of the class described the combination of a frame, a brake drum, a brake band thereon, one end of which engages said frame as an abutment, a member reciprocably mounted in said frame and connected to the opposite end of said brake band and means comprising a pull rod having a wedge shaped portion engaging opposed faces on said frame and member for operating said member.

7. In a device of the class described the combination of a frame, a brake drum, a brake band thereon one end of which engages said frame, a member reciprocably mounted in said frame and connected to the opposite end of said brake band, said member having an opening therethrough and a pull rod for actuating said brake having a wedge shaped extremity extending through said opening and engaging opposed faces on said frame and said member.

In testimony whereof, I affix my signature.

EDWARD H. BELDEN.